(12) United States Patent
    Hanan et al.

(10) Patent No.:     US 12,697,787 B2
(45) **Date of Patent:        *Aug. 4, 2026**

(54) DEVICE FOR FOLDING OF AN EDGE PORTION OF A CLOSURE CAP

(71) Applicants: PackSys Global AG, Ruti ZH (CH);
         Origin Materials Operating, Inc.,
         West Sacramento, CA (US)

(72) Inventors: Jay Clarke Hanan, Glendora, CA
         (US); Rachel Egan Hess, Bethesda,
         MD (US); Pascal Schaad, Bettlach
         (CH); Paul Flükiger, Heimberg (CH);
         Julius Läubli, Jona (CH)

(73) Assignees: Origin Materials Operating, Inc.,
         West Sacramento, CA (US); **Packsys
         Global AG** (CH)

( * ) Notice:    Subject to any disclaimer, the term of this
         patent is extended or adjusted under 35
         U.S.C. 154(b) by 0 days.

This patent is subject to a terminal dis-
         claimer.

(21) Appl. No.: 19/234,532

(22) Filed:    Jun. 11, 2025

(65)          Prior Publication Data

US 2026/0034746 A1      Feb. 5, 2026

Related U.S. Application Data

(63) Continuation of application No. 19/083,873, filed on
     Mar. 19, 2025, now Pat. No. 12,371,210, which is a
                  (Continued)

(30)        Foreign Application Priority Data

Oct. 17, 2023    (EP) .................................... 23204175

(51) Int. Cl.
     B29C 53/02        (2006.01)
     B29C 67/00        (2017.01)
               (Continued)

(52) U.S. Cl.
     CPC .......... B29C 67/0044 (2013.01); B29C 53/02
          (2013.01); B65B 17/00 (2013.01); **B29L
                           2031/565** (2013.01)

(58) Field of Classification Search
     CPC ..... B29C 57/00; B29C 53/02; B26F 2210/04;
                         B29L 2031/565; B65B 17/00
     See application file for complete search history.

(56)            References Cited

U.S. PATENT DOCUMENTS 3,416,476 A  *  12/1968  Wyss ..................... B21D 51/32
                                                             413/6
   4,721,218 A  *   1/1988  Gregory ............. B65D 41/3428
                                                            215/258
   5,660,289 A  *   8/1997  Spatz ..................... B26D 7/01
                                                            215/252
   5,809,860 A  *   9/1998  Haaser ............... B65D 41/3438
                                                            425/291

(Continued)

FOREIGN PATENT DOCUMENTS

WO      2015/173159 A1    11/2015
   WO       2023094043 A1     6/2023
               (Continued)

OTHER PUBLICATIONS
International Search Report issued Nov. 25, 2024 for PCT/EP2024/
078282.

*Primary Examiner* — Andrew M Tecco
(74) *Attorney, Agent, or Firm* — Gavrilovich, Dodd &
Lindsey LLP

(57)          ABSTRACT
A device for folding an edge portion (72) along a circum-
ferential direction of a mantle of a closure cap (70) for a
container, for forming a retaining ring on the closure cap
(70), comprises a first transport device for transporting the
closure cap (70) along a transport path, which comprises a
processing path, wherein the first transport device comprises
a driver (60) rotatable about an axis of rotation for receiving
a closure cap (70). A stationary folding rail (10; 50) with a
folding angle that changes along the processing path is
arranged along the processing path in such a way that during
               (Continued)

transport of a closure cap (70) by the first transport device along the folding rail (10; 50), the edge portion (72) can be folded along the circumferential direction of the mantle of the closure cap (70) in the direction of the axis of rotation about a folding axis that is orientated orthogonally to the axis of rotation and spaced apart from the axis of rotation.

15 Claims, 4 Drawing Sheets

Related U.S. Application Data continuation of application No. PCT/EP2024/078282, filed on Oct. 8, 2024.

(51) Int. Cl.
B65B 17/00 (2006.01)
*B29L 31/56* (2006.01)

(56) References Cited

U.S. PATENT DOCUMENTS

| 8,980,153 | B2 * | 3/2015 | Falzoni | B29C 57/00 |
| | | | | 264/265 |
| 11,919,187 | B2 * | 3/2024 | Flükiger | B26D 3/08 |
| 12,371,210 | B1 * | 7/2025 | Hanan | B29C 53/02 |
| 2007/0089587 | A1 * | 4/2007 | Liao | B26F 1/18 |
| | | | | 83/879 |
| 2008/0092369 | A1 * | 4/2008 | Liao | B29C 57/00 |
| | | | | 83/401 |
| 2011/0260363 | A1 * | 10/2011 | Falzoni | B29C 53/02 |
| | | | | 264/295 |
| 2022/0379515 | A1 * | 12/2022 | Friedli | B26F 1/18 |
| 2023/0001596 | A1 * | 1/2023 | Flükiger | B26D 7/01 |

FOREIGN PATENT DOCUMENTS

| WO | 2024/157175 A1 | 8/2024 |
| WO | 2025/088400 A1 | 5/2025 |

* cited by examiner

DEVICE FOR FOLDING OF AN EDGE PORTION OF A CLOSURE CAP

CROSS REFERENCE TO RELATED APPLICATIONS

This application is a continuation of U.S. application Ser. No. 19/083,873, filed Mar. 19, 2025, which is a continuation of International Application No. PCT/EP2024/078282, filed Oct. 8, 2024, which claims priority to European Application No. 23204175.6, filed Oct. 17, 2023, each of which is hereby incorporated by reference in its entirety.

TECHNICAL FIELD

The invention relates to device for folding an edge portion along a circumferential direction of a mantle of a closure cap for a container to form a retaining ring on the closure cap, comprising a first transport device for transporting the closure cap along a transport path comprising a processing path, wherein the first transport device comprises a driver for receiving a closure cap which is rotatable about an axis of rotation. The invention further relates to a corresponding method for folding an edge portion along a circumferential direction of a mantle of a closure cap for a container.

BACKGROUND ART

In order to ensure that consumers buying a container, such as a drinks bottle, can be sure that the container is still in its original condition and has not been opened intentionally or unintentionally, closure caps for such containers are usually fitted with a retaining ring. This retaining ring is connected to a base part of the closure cap that fulfils the closure function via a predetermined breaking point, so that when the container is opened, the predetermined breaking point is forcibly damaged and the initial opening of the container is thus reliably recognisable from the outside. To ensure this safety function, the retaining ring is held on the container at least until the predetermined breaking point is broken when the cap part is removed or unscrewed. For this purpose, the container usually has an undercut, e.g. in the form of a bead, on a nozzle on which the closure cap sits, in the direction of removal, which is gripped by the retaining ring from below, i.e. against the direction of opening. As a result, when the closure cap is removed, the retaining ring locks against being pulled off at the bead of the container, so that the predetermined breaking point is torn open. Typically, a circumferential, sometimes interrupted, inwardly folded fold is formed on the retaining ring for this purpose, with which the retaining ring engages behind the bead on the container. It is also known to provide a thickened section on the inside of the retaining ring instead of a fold.

In order to prevent the base part from being separated from the container after removal, the brine fracture point can be designed in such a way that a connection between the base part and the retaining ring remains after removal ('tethered cap'). This is advantageous in terms of ecological compatibility, in particular a reduction in uncontrolled disposal of plastic waste, for example.

Such retaining rings are often produced by cutting a cutting geometry into a closure cap. The cut geometry corresponds to one or more predetermined breaking points.

Usually, after the fold, i.e. the part of the retaining ring that engages behind the bead, is formed as an extension of the cap produced in an injection moulding process and folded inwards before or after the cut geometry is formed.

Devices are known for folding inwards which efficiently fold the folded part inwards with the aid of a cylinder. However, this requires that the retaining ring is at least parallel to the axis of rotation of the closure—at least not protruding beyond the radius of the closure cap.

In other embodiments of the closure cap, e.g. in closure caps made of PET (polyethylene terephthalate) by thermoforming, it is desirable for the area of the retaining ring to protrude radially outwards and to be folded inwards after the cut geometry has been incised. No sufficiently efficient devices and processes are currently known for folding the radially outwardly projecting retaining ring inwards.

SUMMARY OF THE INVENTION

The object of the invention is to create a device belonging to the technical field initially mentioned, with which an edge portion, which is directed outwards from the closure cap before the folding process, can be folded particularly easily and efficiently along a circumferential direction of a mantle of a closure cap for a container.

The solution to the problem is specified by a device according to the features of independent claim 1 and a method according to the features of independent claim 13.

According to the invention, the device for folding an edge portion along a circumferential direction of a mantle of a closure cap for a container to form a retaining ring on the closure cap comprises the following:

a) a first transport device for transporting the closure cap along a transport path comprising a processing path, wherein b) the first transport device comprises a driver which can be rotated about an axis of rotation for receiving a closure cap, wherein c) a stationary folding rail with a folding angle which changes along the processing path is arranged along the processing path in such a way that, during transport of a closure cap by the first transport device along the folding rail, the edge portion can be folded along the circumferential direction of the mantle of the closure cap in the direction of the axis of rotation about a folding axis which is orientated orthogonally to the axis of rotation and spaced apart from the axis of rotation.

The edge portion of the closure cap is preferably directed essentially radially outwards before the folding process. Such blanks can be produced particularly efficiently by deep drawing. For this purpose, the closure cap can be punched out at the same time or after deep drawing, whereby the edge portion is formed at the same time as the punching process. The edge portion particularly preferably comprises several wings which protrude radially outwards on the circumference before the folding process. In principle, the wings can be of any shape, such as square, rectangular, trapezoidal, circular, etc. The person skilled in the art is aware that the closure caps can also be manufactured in other ways (e.g. by an injection moulding process) or made of other materials.

Preferably, there is a weakening line between the edge portion and the closure cap. This serves to ensure that the retaining ring can be removed from a consumer with a certain amount of force. The weakening line preferably comprises several slots on the circumference. These are preferably incised. The weakening line can be introduced before or after the folding process. In variants, the folding rail can have corresponding knives, with which the weakening line can be introduced at the same time as the folding process. The knives can be designed in such a way that the cutting depth is continuously increased.

The closure caps are provided to the device by known means. The closure cap can be provided in a variety of known ways. For example, the closure cap can be provided from a reservoir made by a separating device such as a disc sorter or a carousel.

The first transport device picks up the separated closure caps with the driver and transports them along the transport path. The skilled person is aware of a number of ways in which the first transport device can pick up the closure cap with the driver. It is conceivable, for example, that the closure cap is held in a receptacle that can move along the transport path or in a chuck that can move along the transport path and which encloses the closure cap from the outside and below (so that the edge portion remains free). In other embodiments, the driver may comprise a support mandrel which engages in an interior space of the closure cap and thus transports the closure cap along the transport path.

The first transport device comprises a rotatable driver for holding a closure cap. The driver can grip the closure cap and is designed to be rotatable, so that when the closure cap is transported along the folding rail, the driver rotates so that the edge portion can be folded over the entire circumference.

The transport path through which the closure cap travels in the course of the method according to the invention denotes at least one section of a process path. In the present case, the transport path comprises at least the processing path in which an edge portion of the mantle of the closure cap is folded. In principle, the processing path can comprise a plurality of processing stations, such as a cutting blade for generating a cutting geometry in the mantle of the closure cap, a printing station for printing the closure cap and/or stations for further processing steps of the closure cap, in which a property of the closure cap is changed.

According to the invention, the processing path comprises at least one stationary folding rail with a folding angle that changes along the processing path. The folding rail forms at least a part of the processing path, but may in particular also correspond to the entire processing path.

The folding rail projects into the transport path of the closure cap in such a way that the edge portion of the mantle of the closure cap is folded when it is transported by the transport device along the folding rail.

To feed the closure cap to the processing path, the transport path can comprise a feed section which is located upstream of the processing path in the process direction and preferably directly adjoins it. As a rule, the feed section is only used to feed the closure cap to the processing path, i.e. no processing of the closure cap takes place on this section of the transport path. However, a feed section does not necessarily have to be present and the closure cap can, for example, be collected in a separating device and fed directly to the processing path.

The transport path defines a transport plane through its course in the area of the folding rail. The axis of rotation of the driver is preferably perpendicular to the transport plane. In principle, the axis of rotation can also be swiveled in relation to the transport plane, but in the following, it is assumed that the axis of rotation is perpendicular to the transport plane, unless otherwise defined.

The folding axis lies in the transport plane, i.e. orthogonal to the axis of rotation, and is at a distance from the axis of rotation. The folding axis is present in relation to the edge portion of the mantle as a tangent, which separates the edge portion to be folded from the rest of the closure cap.

The folding angle is measured as an angle in a plane at right angles to the transport plane, whereby the transport plane forms the angle 0 and the axis of rotation therefore has an angle of 90°. The folding angle can therefore increase evenly or in several stages between 0° and 180°, for example. With a folding angle of 180°, a radially outward-facing edge portion of the closure cap would be folded radially inwards (see below). The folding rail is the tool with which the folding angle is realized.

The advantage of the device according to the invention is that a continuously operating device for folding an edge portion of a closure cap is created, which is constructed simply and with few moving parts due to the stationary folding rails and is particularly efficient due to the transport with a rotatable driver. It is therefore possible to process a large number of closure caps simultaneously with the device. Due to the simple design, it is also possible to shape the folding rail as required in order to integrate it into an existing system in the most space-saving way possible. For example, the folding rail can be straight, curved, etc. This allows the device to be integrated particularly flexibly as a transition between two processing stations (e.g. to a subsequent printing station).

Preferably, the folding rail comprises a first folding rail section with a first folding surface and a second folding rail section with a second folding surface adjoining the first folding rail section in a transport direction of the closure cap, wherein the first folding surface has a first folding angle and the second folding surface has a second folding angle, wherein the first folding angle differs from the second folding angle. This allows the edge portion to be folded in stages. The advantage of folding in stages is that the edge portion can be prevented or minimized from springing back and the material can relax between the individual folding steps.

The transport direction is defined as the direction along the folding rail, although depending on the geometry of the folding rail, this direction does not necessarily have to extend along a straight line. The transport direction extends from the first folding rail section to the second folding rail section.

This allows the folding angle to be gradually increased in order to finally achieve the desired folding angle of the edge portion. The first folding rail section preferably comprises a folding surface that is essentially planar between two edge portions.

In cross-section, the folding surface can have a curvature at right angles to the transport plane and at right angles to the transport direction, particularly in the edge portion, which can, for example, absorb a bead formation during the folding process or ensure better support of the edge portion. However, the folding surface can also be shaped differently in cross-section, for example in the form of a circular arc section or another type of curve. The optimum shape of the folding surface is preferably to be determined on the basis of a cross-sectional area of the edge portion to be folded lying in the axis of rotation.

Preferably, a transition between the first folding rail section and the second folding rail section comprises a ramp which connects the first folding surface to the second folding surface. The ramp serves to transfer the edge portion from the first folding angle to the second folding angle with little resistance. The ramp is particularly advantageous if the edge portion comprises several radially protruding wings lying in the transport plane before the folding process. In this case, the ramp can be used to prevent a wing from catching in the transition area between the two folding surfaces.

The ramp preferably has an angle to the folding surface of between 15° and 70°, preferably between 35° and 60°. On the one hand, the angle should be sufficiently large so that the ramp is as short as possible and the device remains compact-on the other hand, the angle should also be sufficiently small so that the edge portion and thus the closure cap experience as little resistance as possible during the transition between the folding surfaces. Preferably, the ramp is short in relation to the length of the folding rail section in the transport direction, in particular the length of the ramp is less than 10%, preferably less than 5% of the length of the first or second folding rail section.

In variants, the first folding rail section can also be directly adjacent to the second folding rail section, in particular if the difference between the first folding angle and the second folding angle is small. In this case, for example, an edge may be rounded at the transition between the first and second folding rail section in order to offer less resistance to the edge section at the transition. Furthermore, the first folding rail section can also have a continuously changing folding angle, which ultimately merges seamlessly and without a ramp into the second folding rail section.

Preferably, the folding rail further comprises a third folding rail section adjoining the second folding rail section with a third folding surface and a fourth folding rail section adjoining the third folding rail section with a fourth folding surface, wherein the third folding surface has a third folding angle at right angles to the axis of rotation and the fourth folding surface has a fourth folding angle at right angles to the axis of rotation. The device thus preferably comprises at least four folding rail sections. The folding angles increase in the transport direction. This means that the fourth folding angle is greater than the third folding angle and the third folding angle is greater than the second folding angle. This results in a gradual increase in the folding angle. Preferably, the third and fourth folding rail sections also have an essentially constant folding angle and are thus-apart from the folding angle-designed analogue to the first folding rail section and the second folding rail section. In practice, it has been shown that with 4 to 8 folding rail sections, particularly good results can be achieved with standard closure caps, for example for drinks bottles between 0.25 liters and 1.5 liters. However, the skilled person is aware that the device can also be equipped with nine, ten or more folding rail sections. This depends in particular on the desired folding angle, the material of the closure cap and the material thickness of the edge portion.

In variants, only exactly two or exactly three folding rail sections can also be provided. Furthermore, one or more folding rail sections of the folding rail can also have a continuously changing folding angle (see above).

Preferably, at least two neighboring folding rail sections, for example the first folding rail section and the second folding rail section, are formed in one piece. This allows the folding rail and, in particular, a transition (ramp, see above) between individual neighboring folding rail sections with a constant folding angle to be designed with particular precision.

In variants, the folding rail sections can also be provided as separate parts that can be assembled to form a folding rail. This enables a modular design, which allows cost-effective adjustments to be made to the individual folding angles by replacing the corresponding folding rail sections.

Preferably, the folding rail is made of a blank of metal, preferably steel, in particular by a milling process, a grinding process or both processes. In variants, the folding rail can also be made of other materials, for example a composite material. Further variants are known to the skilled person.

The first folding angle is preferably between 20° and 60°, in particular between 30° and 50°. It has been shown that this angle range represents a particularly ideal entry point into the folding rail for edge portions of closure caps that project radially outwards. In order to simplify the entrance for the edge portion to the first folding rail section, a ramp is preferably provided which forms a transition from the transport plane to the first folding angle. This ramp is particularly useful if the unfolded edge portion projects essentially radially outwards.

In variants, the first folding angle can also be less than 20° or greater than 60°. The ideal first folding angle results from the orientation of the edge portion of the closure cap before the folding process, as well as from the material and the material thickness of the edge portion.

Preferably, the folding angle between neighboring folding rail sections increases in the transport direction by an angle between 5° and 35°, preferably by an angle between 10° and 30°. These angular steps between neighboring folding rail sections have proven to be particularly ideal in practice. This means that successive increments of the angles are preferably different. On the one hand, this means that the edge portion is not subjected to too much stress, which can prevent damage to the closure cap. Furthermore, this prevents the closure caps from getting stuck at a transition between two folding rail sections, thus ensuring a robust process. On the other hand, a sufficiently large folding angle step is achieved, which keeps the overall length of the processing path within limits and allows the process to be carried out efficiently.

In variants, the folding angle between two neighboring folding rail sections can also increase by an angle of less than 5° or by an angle of more than 35°.

Preferably, the largest folding angle is between 120° and 180°, in particular between 140° and 160°. This means that an edge portion projecting essentially radially outwards can be folded essentially radially inwards to form a retaining ring.

In variants, the largest folding angle can also be less than 120°.

If a folding angle of more than 180° is required, this can be achieved with an additional folding step, e.g. with a simple linear plunger, or directly by screwing the closure cap onto the bottle.

The method can therefore also include a subsequent processing step following the transport along the folding rail to increase the folding angle, whereby in particular a cylinder is moved coaxially to the closure cap in such a way that the cylinder contacts the edge portion and folds downwards into the closure cap in order to increase the folding angle. For this purpose, the cylinder is preferably only moved axially and not rotated relative to the cap.

The weakening line can be cut before or during the folding process with the folding rail, between the folding process with the folding rail and the subsequent processing step. Furthermore, cutting can also take place simultaneously or subsequently to the subsequent processing step.

Preferably, in a first step, the edge portion is folded to a folding angle of more than 90°, preferably to a folding angle between 120° and 180°, using the folding rail, and in a second step, the folding angle is further increased in a conventional manner in a subsequent processing step using a cylinder, in particular to an angle greater than 180°, preferably to an angle greater than 220°. For this purpose, the cylinder is moved in a known manner coaxially to the closure cap in such a way that the edge portion is captured by the cylinder and folded downwards into the closure cap.

The skilled person is also familiar with other techniques for further increasing the folding angle after processing with the folding rail.

The subsequent processing step with the cylinder is highly efficient, as it is a particularly simple and fast process step. It can therefore be advantageous to optimize the process in such a way that the folding angle is only increased with the folding rail or the folding rail sections to the extent that the cylinder can then be used for the subsequent folding process. In this case, the folding angle achieved with the folding rail is preferably as little as possible above 90°. The cylinder can then be used to set a folding angle of greater than 90°, in particular greater than 120° and especially preferably greater than 180°.

However, if a folding angle of 180° or less is sufficient, the folding angle can also be achieved solely by the folding rail, whereby a subsequent processing step to increase the folding angle is dispensed with.

Preferably, the first folding rail section and the second folding rail section have a minimum length that corresponds to a closure cap circumference. This ensures that a closure cap can be unrolled at least once on the folding rail section, which means that the edge portion can be processed over the entire circumference with the folding rail section. In a preferred embodiment, all folding rail sections have this minimum length.

In variants, the folding rail section can also have a shorter length than a closure cap circumference, in particular if, for example, one or more of the folding rail sections has a continuously changing folding angle.

Preferably, the folding rail has a circular arc shape. This creates a particularly compact device in which, in particular, the closure cap entry can be arranged close to the closure cap discharge.

In variants, the folding rail can also have other shapes, in particular it can be straight, meandering, etc. Other shapes are known to the skilled person.

Preferably, the folding rail and/or the lid can be heated. In particular, the transition between the edge portion and the closure cap can be heated. This allows the edge portion of the closure cap to be heated. On the one hand, this can simplify the forming process and, on the other hand, the material stress caused by the folding process can be reduced. Furthermore, the process can be carried out at a higher speed, which in turn creates a particularly efficient process. Heating the edge portion or the closure cap also causes the folding angle of the edge portion to relax more quickly. Heating can be achieved in ways known to the skilled person, in particular, for example, by direct electrical heating or by heat transfer (e.g. heat pipes or the like) made of any heat source (waste heat from a machine part, building heating, hot water boiler, etc.).

In variants or additionally, the transport device, in particular the driver, can also be heated. Furthermore, the closure cap can also be heated in other ways, e.g. via radiant heat, hot air, hot steam or similar. If necessary, the folding rail and the transport device can also be heated without heating.

While the edge portion is in contact with the folding rail, the folding angle is constant. As soon as the edge portion leaves the folding rail due to the rotation of the closure cap, the folding angle relaxes. The change in the folding angle due to relaxation can be optimized by selecting a suitable temperature. Preferably, the closure cap or the edge portion is therefore heated to a temperature of 20° C. to 100° C., particularly preferably 30° C. to 80° C., more preferably 40° C. to 70° C. This temperature range has proven to be particularly advantageous for closure cap/edge portions made of PET. The folding process can be carried out particularly efficiently in this temperature range. The skilled person is aware that the temperature range can also be selected differently depending on the material, material thickness, folding steps, etc., especially in the case of HDPE (low-branched polyethylene) or other plastics, for example. If the temperature is too low, there is a risk of the material cracking or even breaking. If the temperature is too high, on the other hand, there is a risk that the material will permanently deform in an undesirable way. In this temperature range, the relaxation time can also be reduced, which in turn leads to an efficient process.

Preferably, the driver can be rotated via a friction surface arranged stationary along the processing path. It is particularly preferable for the driver to be rotated indirectly via the closure cap on the friction surface. This allows the closure cap to be rotated without a drive via contact with the friction surface, resulting in a particularly simple design of the device. The closure cap is gripped by the transport device during the process and unrolled along the friction surface. The folding rail is arranged in relation to the friction surface in such a way that the edge portion can be folded on the folding rail at the same time as the closure cap is unrolled on the friction surface.

In principle, the driver can also be rotated directly on a friction surface. This can protect the closure cap. However, this makes it more difficult to synchronize the rotation with the unwinding movement on the folding rail, especially if the closure caps have larger manufacturing tolerances in terms of dimensions.

In variants, the friction surface can also be dispensed with. In this case, the driver can have a drive to achieve unrolling on the folding rail.

Preferably, the friction surface comprises a knurling which engages with a knurling of a closure cap when the device is in operation. Conventional closure caps typically have a knurling on the circumference of the mantle in order to improve the static friction between the fingers and the closure cap during opening. This knurling can also be used to improve the unrolling of the closure cap along the folding rail. For this purpose, a knurled rail is preferably provided below the folding rail in relation to the transport plane, which extends parallel to the folding rail. The transport device guides the closure cap to the knurled rail, where the knurling of the closure cap engages with the knurling of the knurled rail. If the transport device is now moved along the folding rail, the driver is rotated or unrolled with the closure cap via the engagement of the knurling. At the same time, the edge portion of the closure cap is folded by the folding rail.

In a further variant, the closure cap can also be knurled on the inside of the mantle, with the driver mandrel having a corresponding knurling on the outside. This can also ensure that the closure cap unrolls securely.

In variants, the knurling can also be omitted. Sufficient materials are known to those skilled in the art to generate sufficient friction to rotate the closure cap along the folding rail without a knurl.

Preferably, the knurled rail is designed as a separate component, whereby the folding rail can be mounted on the knurled rail, in particular, for example, by screwing, welding, gluing or by other fastening methods known to the skilled person. The design as a separate component has the advantage that the device as a whole can be constructed more simply, as standard products can also be used for the knurled rail if necessary. If the knurled rail or folding rail is damaged or worn, it can be replaced separately, which means that maintenance costs and therefore operating costs can be kept low.

In variants, the knurled rail can also be formed in one piece with the folding rail.

Preferably, the device has at least two, preferably at least three, transport devices for each folding rail section, so that at least two, preferably at least three, closure caps can be processed simultaneously per folding rail section in one process. In particular, exactly three transport devices per folding rail section are of particular advantage if a folding rail section has a length that corresponds to a circumference of the closure cap (see above). This creates a particularly efficient device for folding edge portions of a closure cap.

In variants, exactly one transport device can also be provided per folding rail section.

Particularly preferably, the device comprises at least three transport devices per folding rail section, which are lined up one behind the other in the transport direction within a length of a circumference of a closure cap.

In variants, the transport devices can also be spaced further apart.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Figures 1, 2A, 2B, 2C, 2D:
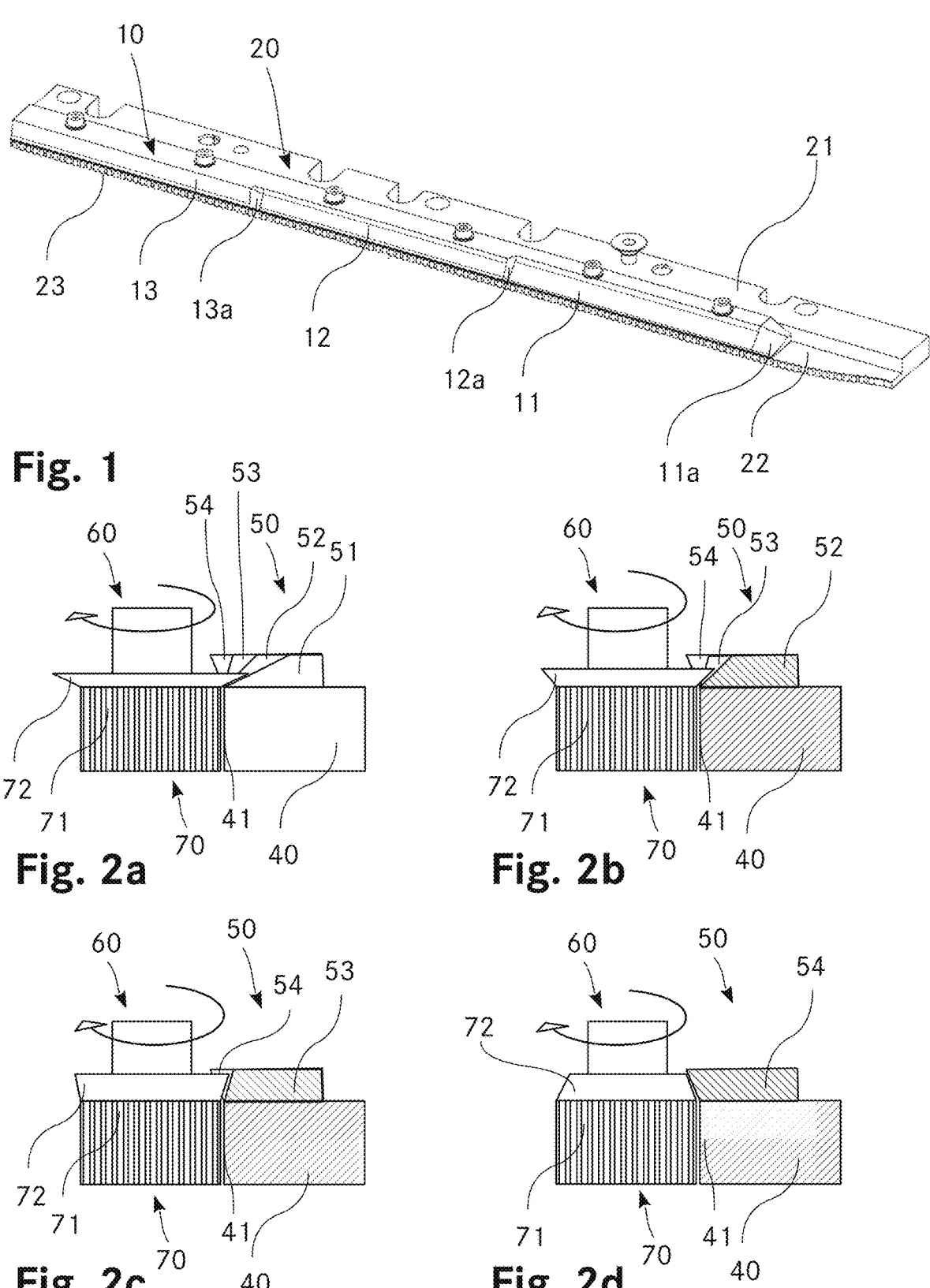
FIG. 1 a schematic representation of an oblique view of a folding rail comprising three folding rail sections with a knurled rail.
FIG. 2a-2d schematic representations of a folding rail with four folding rail sections in the transport direction, during the machining of a closure cap at the respective folding rail sections.

FIG. 1 shows a schematic representation of an oblique view of a folding rail 10 comprising three folding rail sections 11, 12 and 13, as well as a knurled rail 20.

The knurled rail 20 is designed in the present case as a support for the folding rail 10. It comprises a strip with a shoulder 22 aligned in the longitudinal direction, to which the folding rail 10 is attached. Laterally, along the transport direction, the shoulder 22 comprises a knurling 23. The knurling 23 is in engagement with the knurling of the closure cap (see below).

An area 21 with a greater material thickness extends parallel to the shoulder 22. This area 21 is provided with various holes and recesses. These can be designed for fastening and aligning the knurling rail 20 and the folding rail 10 fastened to the knurling rail on a work table (not shown).

In the present embodiment, the folding rail 10 is designed as a strip and comprises a first folding rail section 11, a second folding rail section 12 and a third folding rail section 13.

In the transport direction, the first folding rail section 11 comprises an entry ramp 11a, via which the edge portion of the closure cap is transferred from a transport plane to the first folding angle. This prevents the edge portion from hitting or getting caught on the first folding rail section. The first folding rail section 11 is seamlessly connected to the entry ramp 11a. This has an angle of 45° to the transport plane. This means that the edge portion of the closure cap can be folded from the transport plane at an angle between 0° and 45° to the first folding angle of 45°.

The first folding rail section 11 is adjoined by a transition ramp 12a, which connects the first folding rail section 11 to the second folding rail section 12. Here too, the transition ramp 12a is intended to minimize resistance to the edge portion. The second folding rail section 12 has a second folding angle of 65°. The second folding angle is therefore 20° greater than the first folding angle.

The second folding rail section 12 is in turn adjoined by a transition ramp 13a, which connects the second folding rail section 12 to the third folding rail section 13. Again, the transition ramp 13a is intended to minimize resistance to the edge portion. In the present case, the third folding rail section 13 has a third folding angle of 85°. The third folding angle is therefore again 20° greater than the second folding angle.

The first, second and third folding rail sections have a length that corresponds to the outer circumference or the unrolling circumference of the closure cap to be processed.

FIGS. 2a to 2d show schematic representations of a folding rail 50 with four folding rail sections 51, 52, 53 and 54 in the transport direction, during the processing of a closure cap 70 at the respective folding rail sections.

FIG. 2a shows the folding rail 50 in the transport direction. The folding rail 50 has 4 folding rail sections 51, 52, 53 and 54, with the respective folding angle of the folding rail sections 51, 52, 53 and 54 increasing in the transport direction. The first folding rail section 51 has a folding angle of 45°, the second folding rail section 52 has a folding angle of 65°, the third folding rail section 53 has a folding angle of 85° and the fourth folding rail section 54 has a folding angle of 105°. All folding rail sections have a minimum length of one circumference of the closure cap.

The folding rail 50 is mounted on a knurled rail 40. The knurled rail has a knurl 41 at the side in the transport direction. The closure cap 70 has a corresponding knurling 71, which is in engagement with the knurling 41 of the knurled rail during the process. The closure cap 70 further comprises an edge portion 72, which adjoins the mantle with the knurling 71. In the unmachined state, the edge portion 72 projects substantially radially outwards. The closure cap 70 is held by a rotatable driver 60. The driver 60 is used to roll the closure cap 70 along the knurled rail 40. The edge portion is in contact with the respective folding rail section of the folding rail 50.

In FIG. 2a, the edge portion 72 is already resting on the first folding rail section 51 and thus has an angle of 45° to the transport plane. FIG. 2a also shows the closure cap 70 at the end of the first folding rail section 51, since the edge portion 72 already has an angle of 45° to the transport plane over its entire circumference.

FIG. 2*b* shows an analogue representation to FIG. 2*a*, whereby the closure cap has now passed through the second folding rail section 52. The folding rail 50/knurled rail 40 is shown here in cross-section through the second folding rail section 52. The edge portion 72 now has an angle of 65° to the transport plane.

FIG. 2*c* shows an analogue representation to FIG. 2*a*, whereby the closure cap has now passed through the third folding rail section 53. The folding rail 50/knurled rail 40 is shown in cross-section through the third folding rail section 53. The edge portion 72 now has an angle of 85° to the transport plane.

FIG. 2*d* shows an analogue representation to FIG. 2*a*, whereby the closure cap has now passed through the fourth folding rail section 54. The folding rail 50/knurled rail 40 is shown in cross-section through the fourth and in this case last folding rail section 54. The edge portion 72 now has an angle of 105° to the transport plane.

A maximum angle of 180° can be achieved with the folding rail. In this case, the edge portion projects radially inwards in the transport plane in relation to the mantle of the closure cap. In principle, this initial folding angle can be sufficient so that the complete folding and thus the function of the retaining ring can be achieved by screwing the closure cap onto the bottle.

On the other hand, from a folding angle of more than 90°, for example at 105° or 180°, a subsequent processing step can be provided in order to fold the edge portion beyond a folding angle of 180° so that the edge portion is folded inwards into the closure cap. This makes screwing the closure cap onto a container less prone to errors. In particular, if the folding angle is reduced to less than 180° or even less than 90° after the folding process, the edge portion can rest against the thread of the container or tilt, making it impossible to screw it on, or the edge portion is guided radially outwards in an incorrect manner by the screwing process, which means that the function of the retaining ring is not achieved.

Figure 2E:
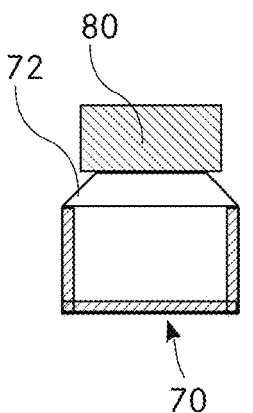
FIG. 2e, 2f schematic representations before and after reworking the edge portion with a cylinder.
Figure 2F:
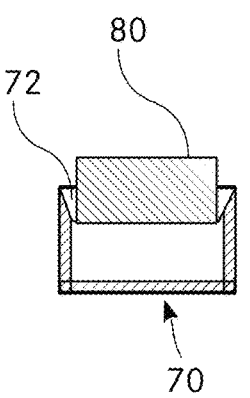

FIGS. 2*e* and 2*f* show schematic representations before and after such reworking of the edge portion 72 of the closure cap 70 with a cylinder 80. The cylinder 80 has a smaller diameter than the inner diameter of the closure cap 70. The closure cap 70 is positioned coaxially to the cylinder 80 (see FIG. 2*e*). The cylinder 80 is then moved downwards in an axial direction so that the cylinder 80 comes into contact with the edge portion and folds it downwards into the closure cap 70 (see FIG. 2*f*). After completion of the folding process with the cylinder 80, folding angles greater than 180° can be achieved (in the present case, the folding angle is around) 240°.

Figure 3A:
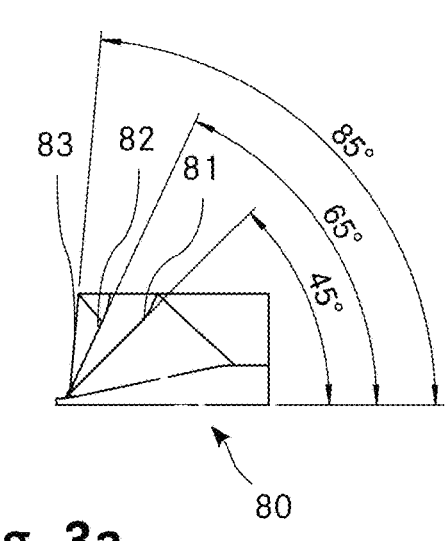
FIG. 3a-3c schematic representations of a folding rail in the transport direction with different folding angles.
Figure 3B:
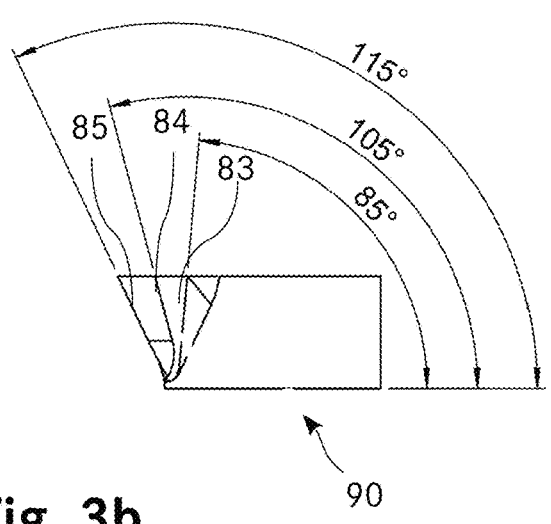
Figure 3C:
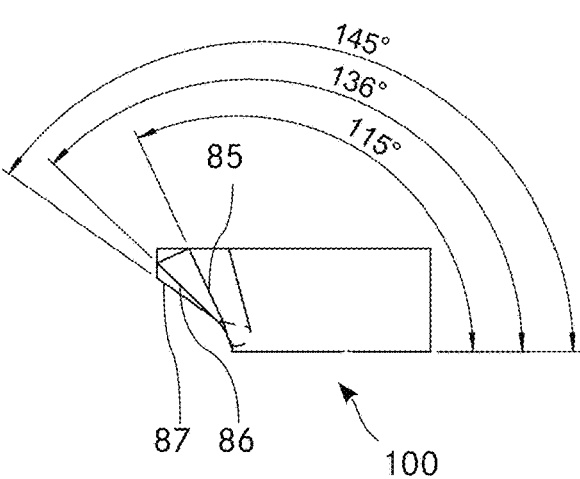

FIGS. 3*a* to 3*c* show schematic representations of a folding rail in the transport direction with different folding angles. The present folding rail comprises three sections 80, 90, 100, each with three folding rail sections, whereby the three figures each overlap in one folding rail section (thus a total of seven folding rail sections).

FIG. 3*a* shows a first folding rail section 80 with three folding rail sections 81, 82 and 83. The first folding rail section 81 has a folding angle of 45°, the second folding rail section 82 has a folding angle of 65° and the third folding rail section 83 has a folding angle of 85°.

FIG. 3*b* shows a second folding rail section 90 with three folding rail sections 83, 84 and 85. The fourth folding rail section 84 has a folding angle of 105° and the fifth folding rail section 85 has a folding angle of 115°.

FIG. 3*c* shows a third folding rail section 100 with three folding rail sections 85, 86 and 87. The sixth folding rail section 86 has a folding angle of 136° and the seventh folding rail section 87 has a folding angle of 145°.

In the present embodiments, the processing path and thus the folding rail is shown in a straight line in each case. However, it is clear to the skilled person that this can also have the form of a circular arc section.

In the present embodiments, the transport device comprises a driver which has an outer diameter that essentially corresponds to the inner diameter of the closure cap. However, the driver can also have an outer diameter that is significantly smaller than the inner diameter of the closure cap, so that in the process the axis of rotation of the driver is offset parallel to an axis of rotation of the closure cap. In this case, the closure cap is held between the driver and the knurled rail during the process.

Figures 4, 5A, 5B, 5C:
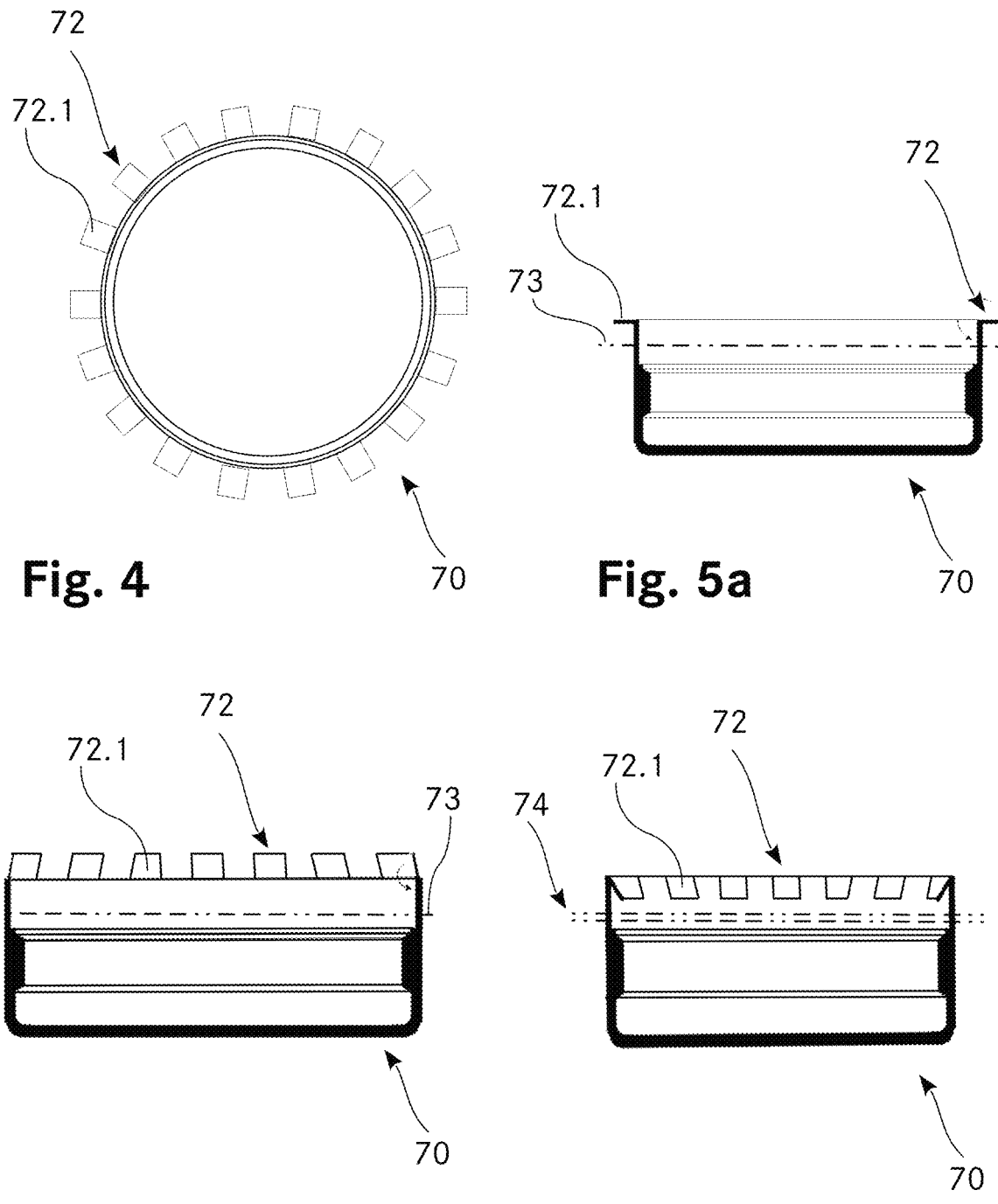
FIG. 4 a schematic representation of a top view of a closure cap with radially arranged wings before the folding process.
FIGS. 5a-5c schematic representations of sectional views through the closure cap before or during successive stations of the folding process.

FIG. 4 shows a schematic top view of a closure cap 70 before the folding process with an edge portion 72, which comprises radially outwardly directed wings 72.1. In the present case, the edge portion 72 is made of 18 essentially square-shaped wings 72.1 (for the sake of clarity, only one wing is provided with the reference sign 72.1 in FIG. 4). The wings 72.1 lie in the transport plane before the folding process. In the manufacturing process, the closure cap is formed from PET by a thermoforming process and the edge portion 72 made of the 18 wings 72.1 is obtained during punching. The skilled person is aware that the wings can also be shaped in other ways. The distance between the wings can also be smaller or larger.

FIGS. 5*a* to 5*c* show schematic representations of sectional views of the closure cap 70 according to FIG. 4 before or during successive stages of the folding process.

FIG. 5*a* shows a sectional view through the axis of rotation of the closure cap 70 before it enters the folding process. The wings 72.1 of the edge portion 72 are directed radially outwards, as can be seen in the plan view in FIG. 4. Furthermore, a sectional plane 73 is shown as the vertical position of the line of weakness. The line of weakness is introduced into the closure cap 70 by a cutting process. The line of weakness can be introduced before, during or after the folding process.

FIG. 5*b* shows the sectional view as shown in FIG. 5*a*, with the wings 72.1 already folded upwards and partially inwards along the folding rail. The angle is 115°. In the further process, the angle can now either be increased further with a folding rail, for example up to 145°. Alternatively, a cylinder can now be used, which is moved coaxially to the closure cap in such a way that the cylinder contacts the wings 72.1 and folds downwards into the closure cap 70 in order to further increase the folding angle.

FIG. 5*c* shows the sectional view as shown in FIG. 5*b*, with the wings 72.1 now folded into the closure cap 70 in their final position. The folding angle is around 240°. In FIG. 5*c*, a sectional area 74 is shown by means of dashed lines as an alternative area to the sectional plane 73. While a single cutting plane is typically sufficient for conventional closure caps with weakening lines, in embodiments of tethered caps in which the closure cap is to remain attached to the container after opening, cuts in different planes at right angles to the axis of rotation and, if necessary, connecting cuts outside these planes are necessary. This makes it possible to create a closure cap, which, after opening, can be swiveled away from the opening of the container, more easily or prevent the closure cap from swiveling back towards the container opening.

Figure 6:
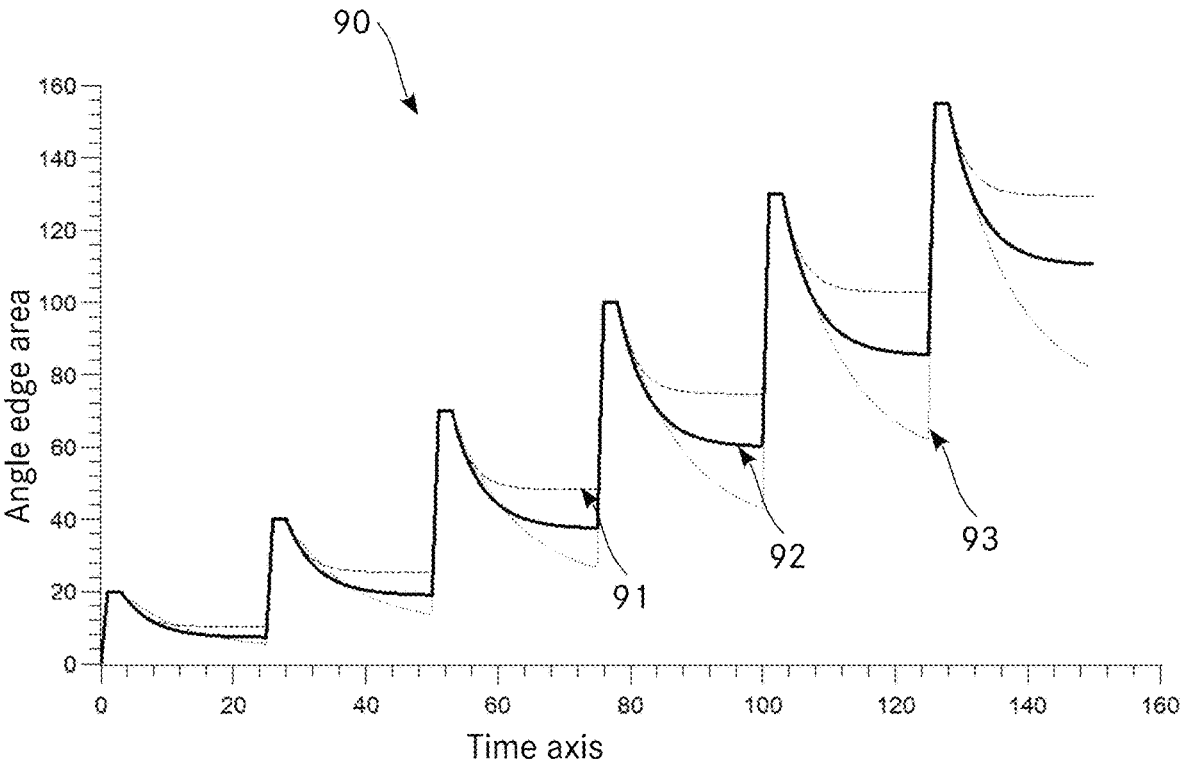
FIG. 6 diagram illustrating the folding behavior of the wings as a function of temperature.

FIG. 6 shows a diagram 90 illustrating the folding behavior of a wing 72.1 as a function of temperature. The edge portion 72 or the wing 72.1 is only guided over the folding rail for a short time, after which it will partially spring back to its initial state depending on the degree of overstretching. The greater the overstretching, the lower the tendency to return to the initial state.

As the material temperature increases, the material becomes more viscous and less elastic, so the degree of overstretching increases as the material temperature rises. The final angle that occurs therefore depends on the temperature during moulding by the folding rail.

Diagram 90 qualitatively illustrates the angle of a wing 72.1 during the unrolling process on the folding rail. The local maxima occur at the points in time at which the wing 72.1 contacts the folding rail. A respective relaxation occurs when the sash loses contact with the rail again as it continues to rotate. Diagram 90 also illustrates (again qualitatively) how different temperatures affect the overall folding behavior.

The preferred temperature is between room temperature and the softening temperature of the plastic. If necessary, the preferred temperature can even be above the softening temperature, especially if the sash is only heated locally for a short time. Preferably, the temperature of the wing 72.1 for PET is 20C° to 100° C., particularly preferably 30° to 80° C., further preferably 40° C. to 70° C. Closure caps 70/wings 72.1 that are too warm are too soft and lead to problems during handling. Closure caps 70/wings 72.1 that are too cold will set back too much.

Too fast processing or too low temperatures can have a negative effect on the result. Overstretching too quickly can also lead to breakage. It has proven to be particularly advantageous to work with warm material.

At higher temperatures (curve 91), the folding angle is less pronounced than at medium temperatures (curve 92) or low temperatures (curve 93). This effect increases with increasing folding angle. This shows that the effect is particularly relevant in the last folding step and thus for the final result of the folding process with the folding rail.

In summary, it can be stated that, according to the invention, a device and a method for folding an edge portion of a closure cap to form a retaining ring are created, which is characterized by a particularly simple and low-maintenance structure.

The invention claimed is:

1. A method of folding an edge portion of a mantle of a closure cap, the method comprising:
   (a) transporting a closure cap along a processing path, with a transport device, wherein the transport device comprises a driver that is rotatable about an axis of rotation for receiving the closure cap,
   (b) rotating a knurling of the closure cap along a corresponding geometric track of a stationary folding rail to drive the transport device along the stationary folding rail as the driver rotates; and
   (c) engaging the edge portion of the mantle of the closure cap along a folding edge of the stationary folding rail using the transport device to fold the edge portion via the folding edge about a folding axis oriented orthogonally to the axis of rotation,
   wherein the stationary folding rail includes a folding edge that extends at different angles along a length of the stationary folding rail.

2. The method of claim 1, wherein the folding edge comprises:
   (a) a first folding edge section with a first folding surface and a first folding angle; and
   (b) a second folding edge section with a second folding surface and a second folding angle that is different than the first folding angle,
   wherein the second folding edge section abuts the first folding edge section in a direction of the processing path of the closure cap.

3. The method of claim 2, wherein the first folding angle is between 20° and 90°.

4. The method of claim 3, wherein the first folding angle is between 40° and 50°.

5. The method of claim 2, wherein the second folding angle is greater than the first folding angle by between 5° and 30°.

6. The method of claim 5, wherein the second folding angle is greater than the first folding angle by between 9° and 21°.

7. The method of claim 2, wherein the second folding angle is between 120° and 180°.

8. The method of claim 7, wherein the second folding angle is between 140° and 160°.

9. The method of claim 2, wherein each of the first folding edge section and the second folding edge section have a length that is as long as a circumference of the closure cap.

10. The method of claim 2, wherein the folding edge further comprises:
   (a) a third folding edge section with a third folding surface and a third folding angle that is greater than the second folding angle, wherein the third folding edge section abuts the second folding edge section in a direction of the processing path of the closure cap; and
   (b) a fourth folding edge section with a fourth folding surface and a fourth folding angle that is greater than the third folding angle, wherein the fourth folding edge section abuts the third folding edge section in the direction of the processing path of the closure cap.

11. The method of claim 10, wherein the fourth folding angle is between 120° and 180°.

12. The method of claim 11, wherein the fourth folding angle is between 140° and 160°.

13. The method of claim 10, wherein the third folding angle is greater than the second folding angle by between 5° and 30°.

14. The method of claim 13, wherein the fourth folding angle is greater than the third folding angle by between 5° and 30°.

15. The method of claim 1, further comprising heating the stationary folding rail.

* * * * *